Patented Oct. 13, 1936

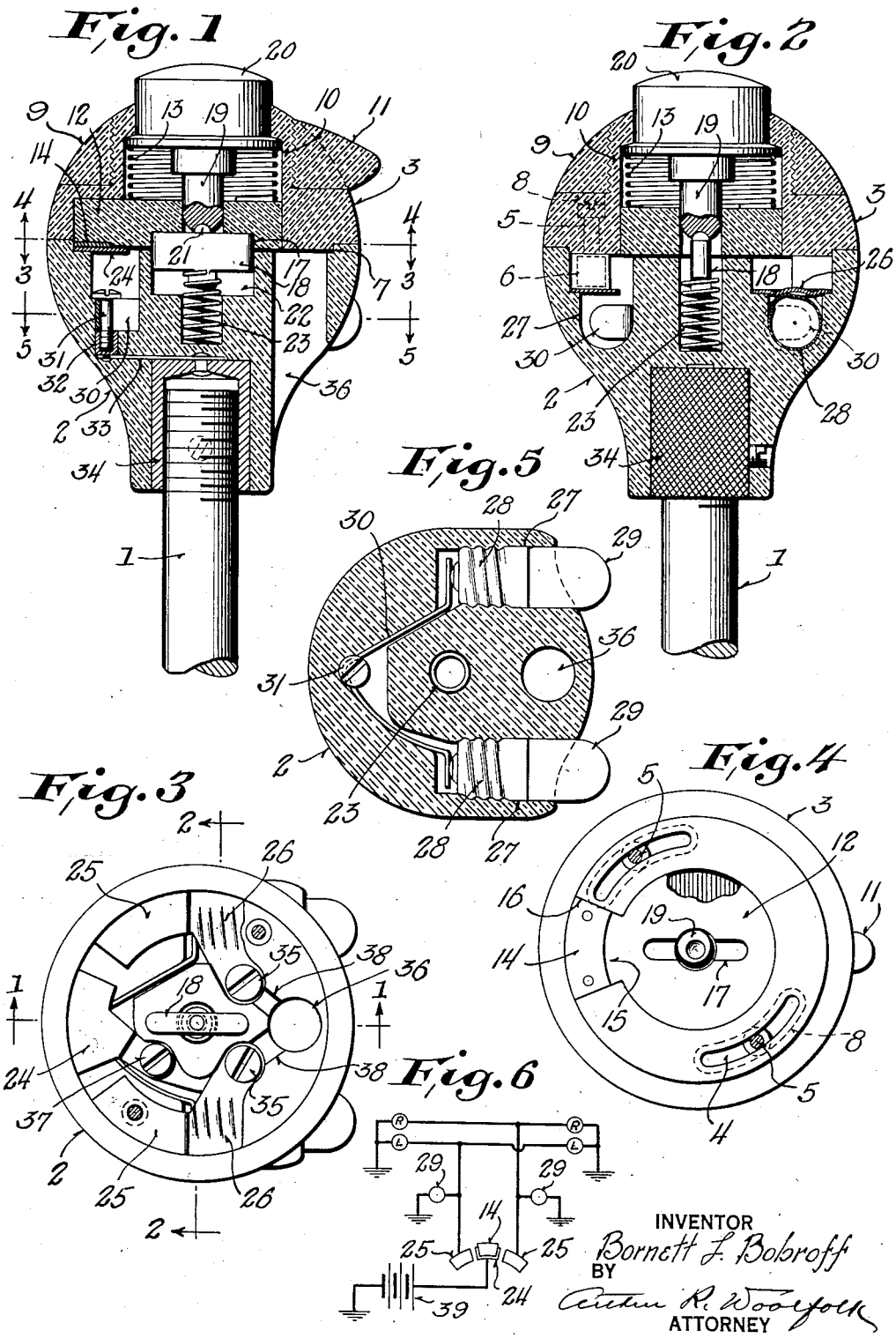

2,057,000

UNITED STATES PATENT OFFICE 2,057,000

SWITCH CONSTRUCTION FOR AUTOMOTIVE VEHICLES

Bornett L. Bobroff, Racine, Wis.

Application February 3, 1933, Serial No. 655,001

3 Claims. (Cl. 200—59)

This invention relates to switch construction for automotive vehicles.

This invention is an improvement over that disclosed in my copending application Serial No. 649,739, filed January 3, 1933, for Switch construction for automotive vehicles, and is generally directed to the same type of device as that disclosed in such copending application.

Objects of this invention are to provide a signal switch construction for automotive vehicles which is carried wholly by the shift gear lever, which is adapted to give a right or left hand signal without requiring the operator to remove his hand from the shift gear knob, which may be easily restored to neutral position, and which is automatically locked in neutral position.

Further objects are to provide a construction of signal switch adapted to be carried by the shift lever of an automotive vehicle in which means are provided which are depressible by the thumb of the operator for releasing the lock for neutral position, and in which the upper portion of the knob is adapted to be rotated by the hand of the operator to the right or to the left to give the desired signal, pilot lights being provided and being carried within the knob itself to give a visual indication to the driver of the active signal.

Further objects are to provide a construction in which the knob of the shift lever is so made that it houses not only the switch but also the pilot lamps and the lock for neutral position without increasing the size of the knob and without making any bulky or awkward construction which would hinder the free use of the shift lever in its usual capacity.

Further objects are to provide a signal switch construction for automotive vehicles which is of simple design, which is easy to produce, which has a few number of parts, and which is not likely to get out of order.

Embodiments of the invention are shown in the accompanying drawing, in which:

Figure 1 is a vertical sectional view through the device, such view corresponding to a section on the line 1—1 of Figure 3.

Figure 2 is a sectional view corresponding to a section on the line 2—2 of Figure 3.

Figure 3 is a view of the lower portion of the device, such view corresponding to a section on the line 3—3 of Figure 1.

Figure 4 is a view of the upper portion of the device, such view corresponding to a section on the line 4—4 of Figure 1.

Figure 5 is a sectional view on the line 5—5 of Figure 1.

Figure 6 is a diagrammatic view showing wiring diagram.

Referring to the drawing, it will be seen that the shift lever has been indicated by the reference character 1. This shift lever carries the shift lever knob or handle which may be formed of "Bakelite" or other suitable material. This handle or shift lever knob comprises a lower portion 2 forming roughly a semi-spherical shaped lower half section of the device.

The upper portion is indicated by the reference character 3 and is provided with oppositely deposited arcuate slots, as indicated by the reference character 4 in Figure 4. Screws 5 pass through these slots and extend into insets formed in the lower portion 2 and as shown in dotted lines in Figure 2 and indicated by the reference character 6. Thus the upper portion may be turned through a limited angle about a vertical axis, to actuate switch mechanism hereinafter described, and carried interiorly of the device. The upper portion is preferably provided with a shoulder indicated by the reference character 7 in Figure 1, and the lower portion is correspondingly shouldered to assist in providing an annular guide or annular interlocking portions for the two half sections.

It is preferable to cover the upper ends of the relatively large portions 8 of the screw slots, see Figure 2, by means of an internally threaded ring 9 formed of "Bakelite" and screwed upon a threaded upwardly extending stem 10 formed on the upper portion 3 of the device, see Figures 1 and 2.

This ring may be provided with a wing or ear 11, see Figures 1 and 4, which projects forwardly of the knob and thus acts as an indicator for the driver to apprise him of the position in which the device is set, so that he may rock it back to neutral after the signal has been given.

The upper portion of the device carries a switch member 12 which is yieldingly pressed downwardly by means of a spring 13 housed within the central portion of the upper member 3.

This switch member 12 is provided with a flush contact 14 of metal, see Figures 1 and 4. It is also provided with an offset segmental portion 15 which fits in a correspondingly shaped segmental cutout 16 formed in the upper portion 3, as most clearly shown in Figure 4. The switch member 12 is formed of "Bakelite" or similar material and is provided with an elongated slot 17 which normally receives the rectangularly shaped locking plunger 18. The member 12 is also provided with a central aperture through which a pin 19 carried by the releasing button or knob 20 projects. This pin may be provided with a recess which receives a nib or projection 21 formed integrally with the plunger 18, as shown in Figure 1. The button or plunger head 20 is preferably flanged to prevent its outward passage from the member 3. It is normally held in the position shown in Figure 1 by means of the spring 13.

The plunger 18 is slidably received within a rectangular recess 22 formed in the bottom portion 2 of the device, a spring 23 urging the plunger upwardly and being socketed within a recess formed in the bottom 2 and fitting over the projection formed on the plunger 18, as shown in Figure 1. It is obvious, therefore, that when the button 20 is depressed, that the plunger 18 is moved out of engagement with the switch member 12 and consequently the top 3 which carries the switch member 12 in an interlocking manner, see Figure 4, may be rocked and thus the switch member may be rocked, the switch member 14 being noted being yieldingly pressed downwardly by the spring 13 and its contact 14 or movable contact travelling over the stationary contacts hereinafter described.

The bottom portion 2 of the device, as may be seen in Figure 3, is provided with three stationary contacts—a central contact 24 and side contacts 25. These side contacts 25 are each provided with a downturned portion 26 which extend downwardly into recesses formed in the bottom portion 2 and constitute the top portion of the pilot lamp receiving apertures 27, see Figure 2. It is to be noted particularly from Figures 2 and 3 that the portions 26 of the contact members are grooved or have a threaded portion which receive the threaded ferrules 28 of the signal lamps 29, see in addition Figure 5. The lamp sockets 27 are themselves formed during the molding process with a threaded section, as shown most clearly in Figure 5, and the lamps project outwardly a sufficient distance so that they may be readily screwed into place or removed from the device.

The center contact of each of the lamps 29 is engaged by one or the other of the arms of a spring 30 which constitutes a ground spring and is locked by means of a screw 31 in place. This screw enters a metal insert 32, see Figure 1, and is connected by means of a strip 33 to the grounded metal ferrule 34 carried by the shift lever 1. It is preferable in all cases in which a metal ferrule is used to provide a roughened or knurled exterior surface, for instance as shown in Figure 2, so that it is more firmly held by the molded "Bakelite".

The contact members 25 and 26 are each provided with a terminal portion provided with a conductor receiving screw 35 which are adapted to receive conductors brought upwardly through the channel or opening 36 formed in the forward lower portion of the device, see Figures 1 and 3. A third conductor leads upwardly and goes to the terminal member of the live or center contact 24 and is held by the screw 37, see Figure 3.

The cable carrying these conductors extends downwardly through the opening 36 and is looped outwardly, as described in my copending application, or connected in any suitable manner whatsoever.

It is preferable to provide channels in the lower portion, as indicated by the reference characters 38, for receiving the conductors.

Wiring diagram is shown in Figure 6. It will be noted that one side of the battery 39 is grounded in the usual way and that its live side is connected to the center contact 24. Each of the contacts 25 are connected to the respective right and left hand signal lamps indicated by the letters R and L and are also connected to the appropriate pilot lamp 29, the pilot lamp in each instance being connected in parallel to the signal lamp. The normal position of the parts is as shown in Figure 6. When it is desired to give a right hand signal, the button 20 is depressed by the hand or thumb of the operator and the upper half section of the device is rotated in a clockwise direction, or in a right hand manner. The movable contact 14 then bridges the live center contact 24 and the right hand contact 25, and thus the right signal lamps and the right hand pilot lamp are lighted. The operator does not have to hold the button 20 down, but releases it and after the automobile has made the turn desired, merely rotates the upper half section back to neutral position.

At this point the plunger 18 will snap upwardly into place and lock the upper half section against further rotary motion.

It is obvious that a left hand signal is given in the identical reverse manner.

It will be seen that whenever the upper half of the device is rotated back to neutral position, that the locking plunger 18 automatically snaps into locking position and locks the device against further motion in either direction. However, the locking plunger is readily released by the depression of the button 20.

It will be seen that a very simple signal switch has been provided which has a small number of parts, which is inexpensive to make, which is sturdy, and which is substantially foolproof.

Although this invention has been described in considerable detail, it is to be understood that such description is intended as illustrative rather than limiting, as the invention may be variously embodied and is to be interpreted as claimed.

I claim:

1. A signal switch for an automotive vehicle, said signal switch comprising a lower part adapted to be secured in a fixed position, an upper part revolubly mounted on said lower part, said upper and lower parts forming jointly a knob-like handle, spaced stationary contacts carried by said lower part, a movable contact carried by said upper part and slidable over said stationary contacts when said upper part is rotated with reference to said lower part, a locking plunger slidably carried by said lower part, a spring urging said plunger upwardly, said upper part having a recess for the reception of a part of said plunger when said movable contact is in neutral position, and detaching means for said plunger carried by said upper part for depressing said plunger when said last mentioned means is depressed, said last mentioned spring and said plunger having their axes co-axial with the axis of said knob-like handle, said locking plunger and the recess in said upper part being non-circular whereby rotation of the upper part is prevented.

2. A signal switch for an automotive vehicle comprising a lower part adapted to be secured to a support, an upper part revolubly carried by said lower part, said upper and lower parts constituting a knob-like handle for actuating a part of the automotive vehicle, stationary contacts carried by said lower part, a member slidably carried by said upper part and provided with a movable contact adapted to slide over said stationary contacts, a locking plunger carried by said lower part, a spring pressing said plunger towards locking position, said member having means interlocking with said plunger when said movable contact is in neutral position, and a button carried by said upper part for releasing said plunger, said button and said plunger being positioned in substantial axial alignment with the longitudinal axis of said knob-like handle.

3. A signal switch for an automotive vehicle, said signal switch comprising a lower part adapted to be secured to a lever of an automotive vehicle, an upper part revolubly mounted on said lower part, said upper and lower parts forming jointly a knob-like handle, spaced stationary contacts carried by said lower part, a movable contact carried by said upper part and normally remaining in neutral position and selectively slidable over said stationary contacts when said upper part is rotated with reference to said lower part, a locking plunger directly carried by said lower part and slidable within an aperture formed directly in said lower part, said locking plunger and said aperture being positioned axially of said upper and lower parts and being laterally elongated, a spring urging said locking plunger upwardly, said upper part having an axially located recess for the reception of a part of said plunger while the remaining part of said plunger stays within the recess in said lower part, the recess in said upper part being laterally elongated to fit said plunger, the axially positioned, laterally elongated plunger cooperating with said laterally elongated recesses to lock said upper part against rotation with reference to said lower part, and a centrally arranged push button carried by said upper part and operatively engaging said plunger to depress said plunger out of engagement with said upper part when said push button is depressed.

BORNETT L. BOBROFF.